US009941056B2

(12) United States Patent
Summey et al.

(10) Patent No.: US 9,941,056 B2
(45) Date of Patent: Apr. 10, 2018

(54) SOLID ELECTROLYTIC CAPACITOR AND METHOD

(71) Applicant: Kemet Electronics Corporation, Simpsonville, SC (US)

(72) Inventors: Brandon Summey, Simpsonville, SC (US); Jeffrey Poltorak, Simpsonville, SC (US)

(73) Assignee: KEMET ELECTRONICS CORPORATION, Simpsonville, SC (US)

( * ) Notice: Subject to any disclaimer, the term of this patent is extended or adjusted under 35 U.S.C. 154(b) by 404 days.

(21) Appl. No.: 14/162,268

(22) Filed: Jan. 23, 2014

(65) Prior Publication Data
US 2014/0211371 A1 Jul. 31, 2014

Related U.S. Application Data

(60) Provisional application No. 61/756,644, filed on Jan. 25, 2013.

(51) Int. Cl.
*H01G 9/012* (2006.01)
*H01G 9/10* (2006.01)
*H01G 9/15* (2006.01)

(52) U.S. Cl.
CPC ............ *H01G 9/012* (2013.01); *H01G 9/10* (2013.01); *H01G 9/15* (2013.01); *Y10T 29/435* (2015.01)

(58) Field of Classification Search
CPC .......... H01G 9/015; H01G 9/00; H01G 9/025; H01G 9/08; H01G 9/012; H01G 9/10
(Continued)

(56) References Cited

U.S. PATENT DOCUMENTS 3,588,628 A 6/1971 Peck
4,017,773 A 4/1977 Cheseldine
(Continued)

FOREIGN PATENT DOCUMENTS

GB 2123610 2/1984
JP 2005-311014 A 11/2005
JP 2009-182157 A 8/2009

OTHER PUBLICATIONS

ISA/KR—International Search Report and Written Opinion; I.A. PCT/US2014/012771; Applicant: Kemet Electronics Corporation; Date of Mailing: Apr. 30, 2014.

*Primary Examiner* — Nguyen T Ha
(74) *Attorney, Agent, or Firm* — Joseph T. Guy; Patent Filing Specialist, Inc.

(57) ABSTRACT

An improved capacitor is provided with at least one anode having a dielectric on the anode and an anode lead extending from the anode. A conductive cathode layer is on the dielectric. An anode leadframe is electrically connected to the anode and a cathode leadframe is electrically connected to the cathode. An encapsulant encases the anode, a portion of the anode leadframe and a portion of the cathode leadframe such that the anode leadframe extends from the encapsulant to form an external anode leadframe and the cathode leadframe extends from the encapsulant to form an external cathode leadframe. At least one secondary electrical connection is provided wherein the secondary electrical connection is in electrical contact with the cathode and extends through the encapsulant to the external cathode leadframe or the secondary electrical contact is in electrical contact with the anode and extends through the encapsulant to the external anode leadframe.

23 Claims, 10 Drawing Sheets

(58) Field of Classification Search
USPC ....... 361/523, 525, 528–529, 535, 536, 538, 361/540
See application file for complete search history.

(56) References Cited

U.S. PATENT DOCUMENTS

| | | | |
|---|---|---|---|
| 4,488,204 | A | 12/1984 | Beck, Jr. |
| 4,561,041 | A | 12/1985 | Crowley et al. |
| 4,571,662 | A | 2/1986 | Conquest et al. |
| 4,581,479 | A | 4/1986 | Moore et al. |
| 5,394,295 | A | 2/1995 | Galvagni et al. |
| 6,236,561 | B1* | 5/2001 | Ogino .................... H01G 9/012 361/301.3 |
| 6,262,878 | B1 | 7/2001 | Shirashige et al. |
| 6,346,127 | B1 | 2/2002 | Kuriyama |
| 6,400,556 | B1 | 6/2002 | Masuda et al. |
| 7,016,180 | B2* | 3/2006 | Yoshihara ............. H01G 9/012 361/528 |
| 7,719,821 | B2* | 5/2010 | Kato ...................... H01G 9/016 361/502 |
| 8,139,344 | B2* | 3/2012 | Navratil ............... H01G 9/0029 361/516 |
| 2003/0169561 | A1* | 9/2003 | Ohya .................... H01G 9/012 361/529 |
| 2004/0251558 | A1* | 12/2004 | Kida ..................... H01G 9/008 257/777 |
| 2007/0159770 | A1* | 7/2007 | Kuriyama ............. H01G 2/065 361/528 |
| 2008/0247122 | A1 | 10/2008 | Vaisman et al. |
| 2009/0116173 | A1* | 5/2009 | Shimizu ................. H01G 9/15 361/529 |
| 2009/0199378 | A1* | 8/2009 | Chacko ................. H01G 9/012 29/25.03 |
| 2011/0088425 | A1 | 4/2011 | Pun et al. |
| 2012/0257327 | A1* | 10/2012 | Zednickova ............ H01G 9/08 361/528 |

* cited by examiner

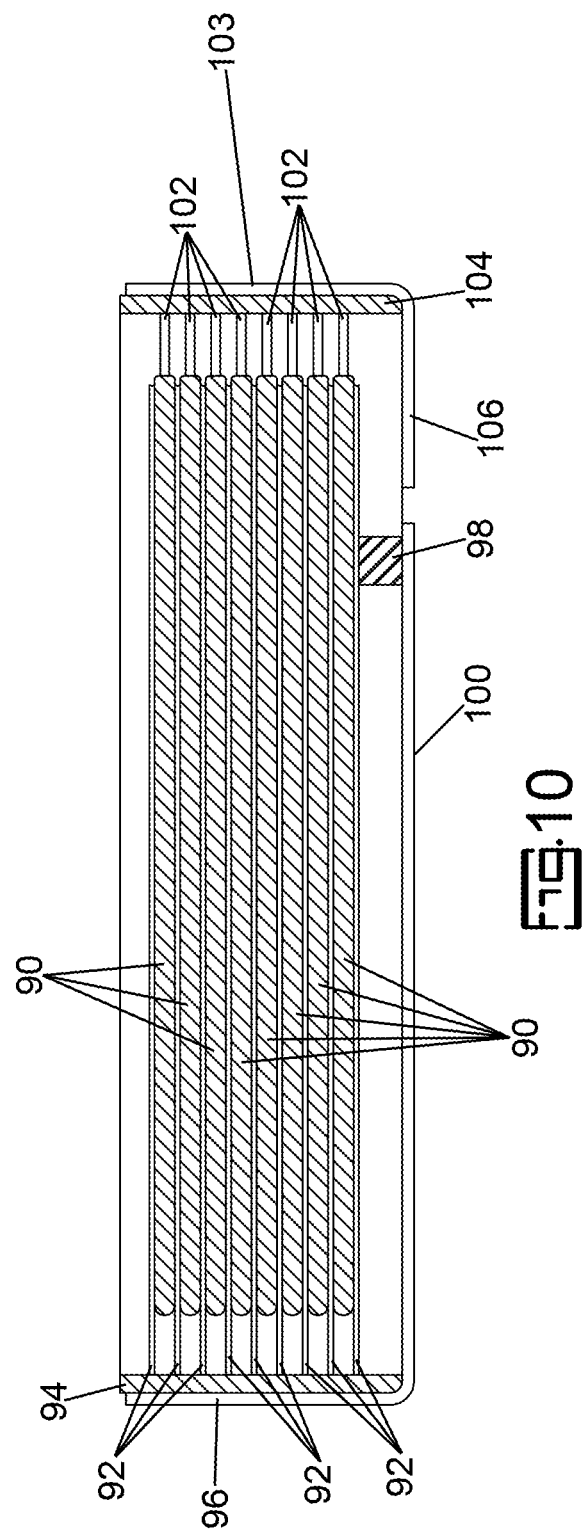

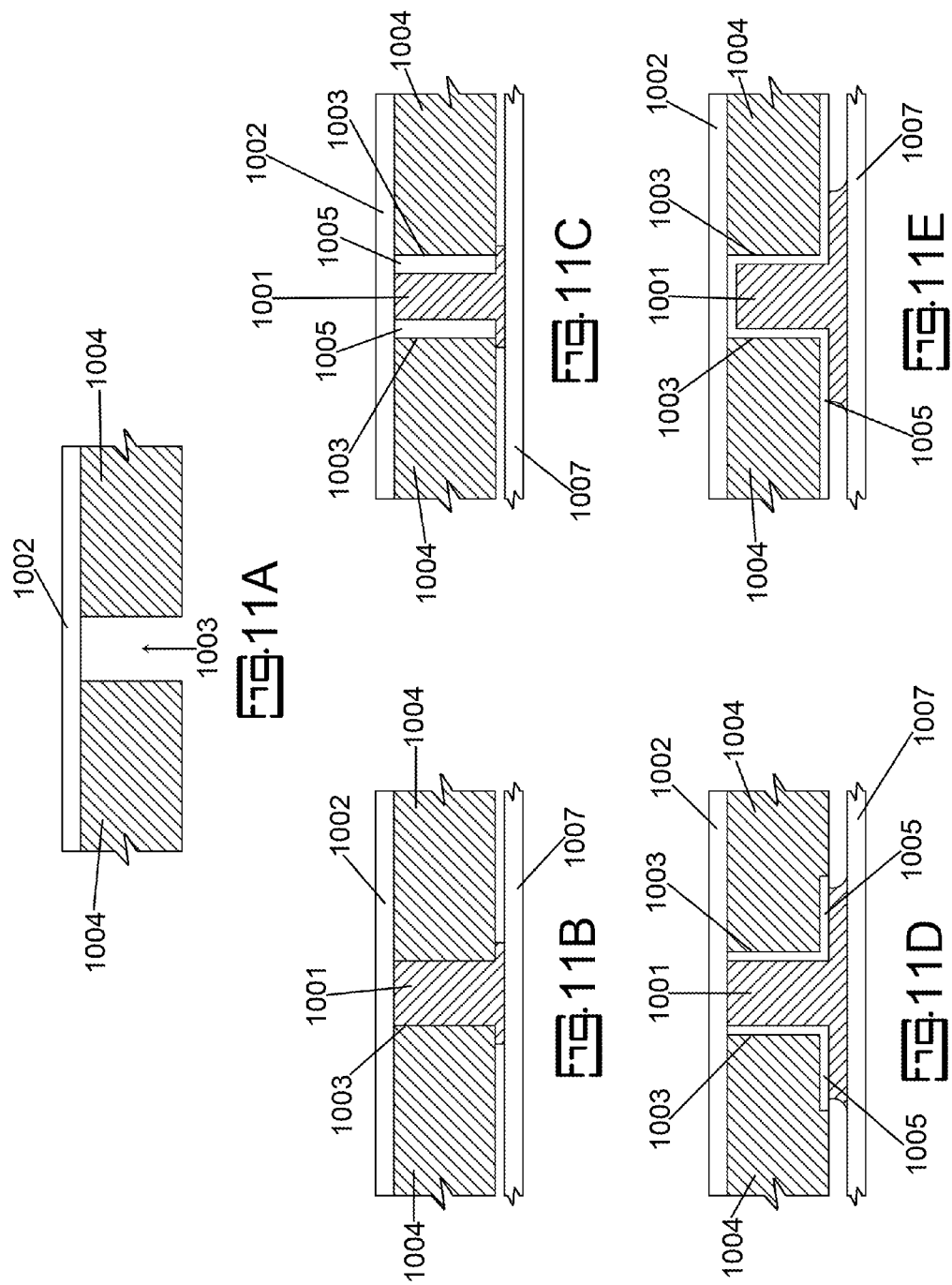

SOLID ELECTROLYTIC CAPACITOR AND METHOD

CROSS-REFERENCE TO RELATED APPLICATIONS

This application claims priority to U.S. Provisional Patent Appl. No. 61/756,644 filed Jan. 25, 2013, which is incorporated herein by reference.

BACKGROUND

Developments in the industry of electronics place continued pressure on those of skill in the art to develop new technologies. One specific ongoing demand, which is related to miniaturization, is the need for solid electrolytic capacitors with ever increasing lower resistance and lower inductance.

Inductance in a solid electrolytic capacitor is mainly the result of excessive current loop area, or loop size, between the anode terminal and cathode terminals. This loop is represented by the electrical path required to complete a circuit through the capacitor.

Many methods have been employed in the industry to lower resistance and inductance such as those methods taught in U.S. Pat. No. 8,344,735 and U.S. Pat. No. 8,254,087 each of which is incorporated herein by reference. In these methods a substrate is manufactured with the conductive terminals in place and the capacitor element is attached to the conductive terminals of the substrate. This process increases the manufacturing cost and results in lower physical reliability. Producing the substrate structure is typically more expensive than the traditional lead frames used in the manufacture of solid electrolytic capacitors. Furthermore, the interface between the substrate and encapsulating resin can result in significantly reduced package integrity relative to encapsulated lead frame devices.

Other methods involve a leadframe material exposed from the bottom of the encapsulating resin as taught in commonly assigned U.S. Pat. No. 6,262,878 which is incorporated herein by reference. This method provides lower inductance but at the expense of production cost and the terminations are not in compliance with industries standards. The high cost and non-standard terminations are both undesirable. Having a leadframe structure exposed below the encapsulating resin requires a change in equipment and additional processes which is highly undesirable. Furthermore, the package integrity is compromised. Since the leadframe is only secured into the encapsulating resin by the edges of the leadframe the leadframe is more susceptible to sheer stresses.

In spite of the ongoing effort those of skill in the art still seek improvements in capacitors, and particularly, improvements in the inductance, ESR and resistance characteristics of capacitors.

SUMMARY OF THE INVENTION

It is an object of the invention to provide an improved solid electrolytic capacitor and an improved method for manufacturing a solid electrolytic capacitor wherein the solid electrolytic capacitor has improved inductance and resistance characteristics.

These and other advantages, as will be realized, are provided in a capacitor with at least one anode having a dielectric on the anode and an anode lead extending from the anode. A conductive cathode layer is on the dielectric. An anode leadframe is electrically connected to the anode and a cathode leadframe is electrically connected to the cathode. An encapsulant encases the anode, a portion of the anode leadframe and a portion of the cathode leadframe such that the anode leadframe extends from the encapsulant to form an external anode leadframe and the cathode leadframe extends from the encapsulant to form an external cathode leadframe. At least one secondary electrical connection is provided wherein the secondary electrical connection is in electrical contact with the cathode and extends through the encapsulant to the external cathode leadframe or the secondary electrical contact is in electrical contact with the anode and extends through the encapsulant to the external anode leadframe.

Yet another embodiment is provided in a method of forming a capacitor comprising;
providing a capacitive element comprising an anode with a dielectric on a surface of the anode and an anode lead extending from the anode and a conductive cathode on the dielectric;
electrically connecting the conductive cathode layer to a cathode leadframe;
electrically connecting the anode to an anode leadframe;
forming an encapsulant around the anode, a portion of the anode leadframe and a portion of the cathode lead frame such that the anode leadframe and the cathode leadframe extend from the encapsulant;
forming at least one of an anode secondary electrical connection or a cathode secondary electrical connection through the encapsulant.

FIGURES

FIG. 10 is a schematic cross-sectional view of an embodiment of the invention.

FIGS. 11A, 11B, 11C, 11D and 11E are schematic representations of embodiments of the invention.

DESCRIPTION

Figure 1:
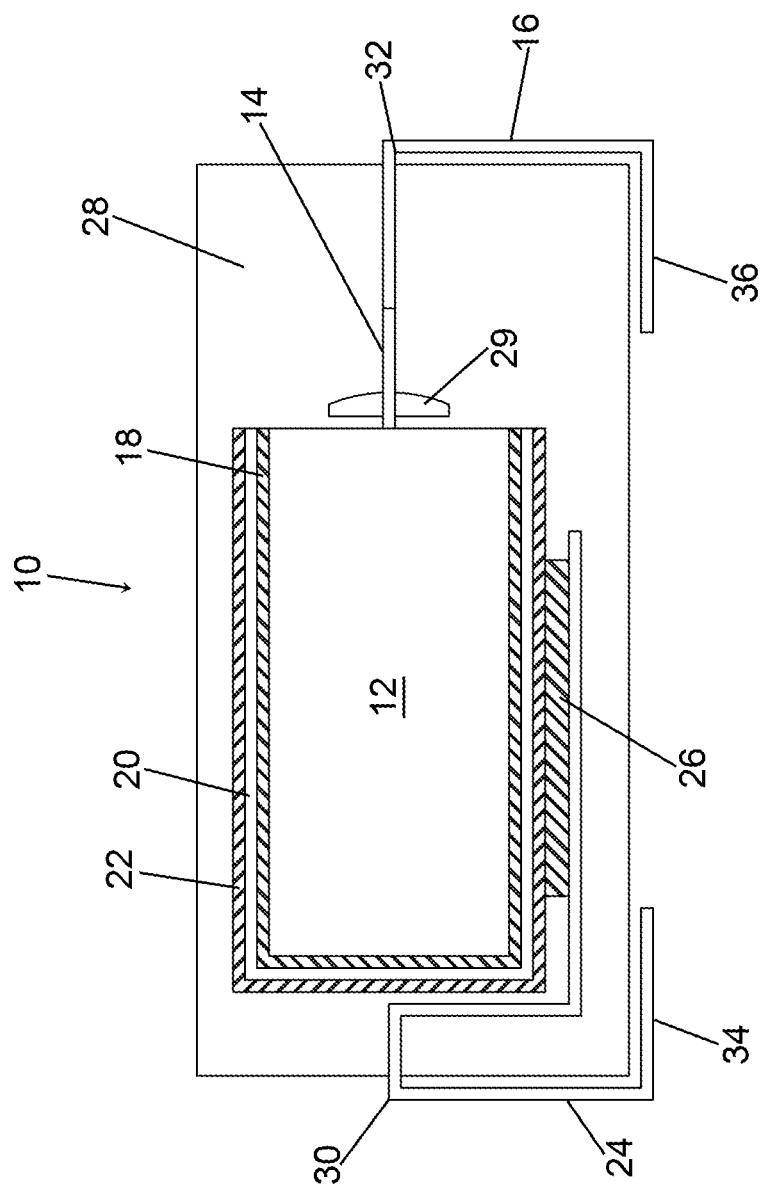
FIG. 1 is a schematic cross-sectional view of a prior art capacitor.

The present invention provides an improvement in solid electrolytic capacitors through the use of at least one electrical connection that forms a secondary electrical path between at least one portion of the lead frame, which is positioned on the bottom of a solid electrolytic capacitor body, and an internal electrical point of the internal capacitor elements wherein the secondary electrical path is shorter than the primary electrical path provided by the lead frame.

Capacitors are widely used in the industry with leadframes that extend, or originate, from opposing ends of an encapsulant. The leadframes are typically bent such that each respective leadframe has a portion that resides on the bottom side of the encapsulant to provide coplanar attachment points for mounting on a circuit. As the size of the capacitor increases the electrical connections through the leadframe result in a large loop area even if the application has these terminals ending in close proximity to each other. The electrical current must therefore pass from one terminal, up one vertical side of the capacitor body, into the encapsulant through the vertical side, around the anode and to the dielectric. It must also repeat a similar path on the opposing terminal side. This path length can be quite great which may result in large inductance.

Described herein is a secondary electrical connection between the terminal or foot portion of the leadframe and the internal electrical components which decreases resistance and induction by shortening the electrical path length. The terminal, for purposes of this invention, will be referred to as the leadframe or terminal structure that is positioned on the bottom surface of the capacitor and is in electrical contact with either than anode or cathode. The internal electrical components refer to but are not limited to the conducting portions of the internal device, such as, leadframe inside the encapsulant, cathode layers inside the encapsulant, anode lead or anode lead wire inside the encapsulant. In a typical capacitor, encapsulant would be present between the terminal and internal electrical components which increases the electrical path length. This long path is reduced herein by the incorporation of a secondary electrical connection between the terminal and internal electrical components thereby reducing the inductance and resistance of the device. The secondary electrical connection is any electrical connection formed through the encapsulant between the terminal and the internal electrical components. This secondary electrical connection, which is in addition to the primary electrical connection defined by the lead frame, extends through the encapsulant and provides a shorter path length than the primary electrical connection.

The secondary electrical connection differs from connections formed in the substrate designs, such as those taught in U.S. Pat. No. 8,344,735 which is incorporated herein by reference, since the formation of the secondary electrical connection is through the encapsulant portion of the device instead of being disposed on the aforementioned substrate. The secondary electrical connection removes the need for the substrate thereby reducing cost and complexity. The secondary electrical connection provides a smaller loop connection through the encapsulant while still having a foot print consistent with existing industry standards.

The secondary electrical connection can be formed in only the anode side of the device, only the cathode side the device, or a combination of both the anode side and cathode side. It is most preferred that at least the cathode side have a secondary electrical connection since this is often the longest path length through a leadframe in a capacitor. Each secondary electrical connection can include a single connector or multiple connectors.

The preferred methods for formation of the secondary electrical connection are selected from a removal method and a formation method. In the removal method the encapsulant is formed and the secondary electrical connection is formed by removing a portion of the encapsulant to form a thru-hole exposing the internal electrical component followed by filling the thru-hole with a conductor. In the formation method the encapsulant is formed with a thru-hole which will receive a conductor to form the secondary electrical connection. Without limit thereto the removal method includes the formation of a thru-hole in the encapsulant thereby exposing the internal electrical component, such as the primary electrical connection, and the secondary electrical connection is formed or disposed in the thru-hole. The removal method can include such techniques as laser drilling, mechanical removal, ion milling, puncturing, or chemical etching. The formation method can include masking during the encapsulation step or injection molding or by forming around the preformed secondary electrical connection element. Combinations of formation and removal methods may be incorporated to achieve the adequate thru-hole or electrical connectivity. These methods are intended to expose the internal electrical component that is to be connected to, such that an electrical connection can be made to the internal electrical component.

The electrical connection between the terminal and the internal electrical component can be achieved by the use of, but not limited to, metal filled conductive adhesive, conductive polymer, carbon filled adhesive, metal plating, metal sputtering, metal flame spray, plating, wirebonding, direct connection, welding, soldering or combinations thereof. It would be obvious to one in the art that other methods of forming the thru-hole or electrical connection exists and may not be listed above. To improve the electrical connection a plated metal layer can be applied to the thru-hole through the encapsulant or along the exposed walls of the thru-hole. One preferred method of forming the electrical connection is the use of metal filled adhesive, such as conductive adhesive.

The invention will be more fully described with reference to the various figures which form an integral non-limiting component of the disclosure. Throughout the disclosure similar elements will be numbered accordingly.

Figure 2:
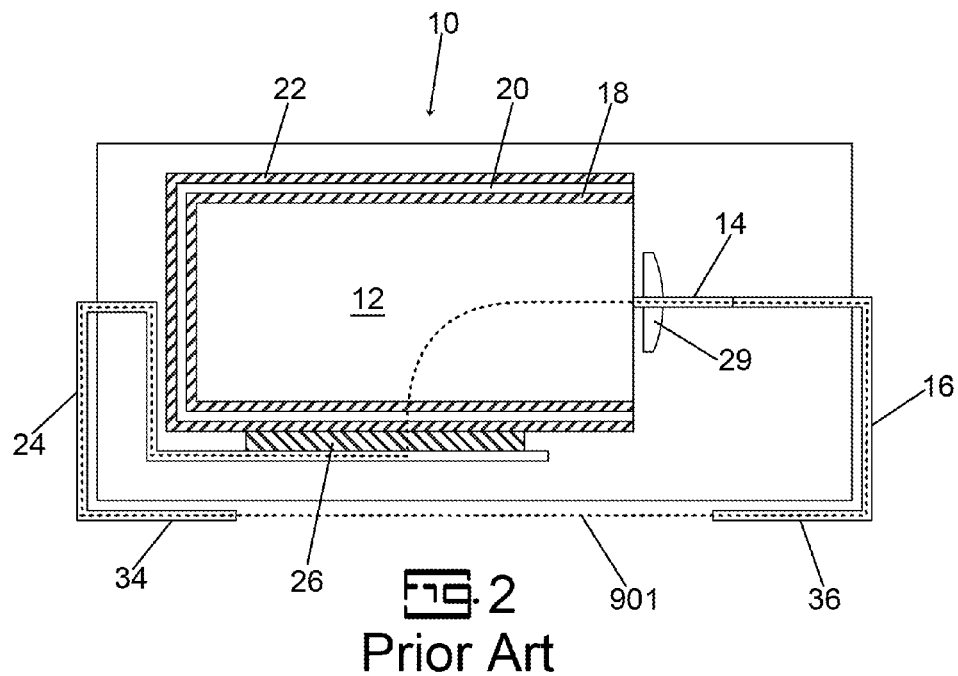
FIG. 2 is a schematic representation of the prior art.

A prior art solid electrolytic capacitor, 10, is illustrated in cross-sectional schematic view in FIG. 1. An anode, 12, has an anode lead wire, 14, either attached thereto or embedded therein as known in the art. The anode lead wire is bonded to an anode leadframe, 16, by a conductive bond such as by welding or the like as known in the art. A dielectric, 18, encases at least a portion of the anode, 12, and preferably up to the entire anode. A cathode, 20, encases at least a portion of the dielectric. The cathode may include a cathode bonding layer, 22, to facilitate adhesion to a cathode lead, 24, by a conductive adhesive, 26. The conductive cathode layers, 20 and 22, are present on the dielectric but are not in direct electrical contact with the anode as would be understood. Encapsulant, 28, surrounds the entire body except for a portion of the anode leadframe and cathode leadframe as would be understood. A optional barrier, 29, may be used to avoid contact between the anode wire or anode lead and elements of the cathode or dielectric. For the purposes of the instant application that portion of the cathode lead frame which is interior to the encapsulant is referred to as inner cathode lead frame and that portion of the cathode lead frame which is external to the encapsulant, starting for illustration purposes at about the bend, 30, is referred to as the external cathode lead frame. For the purposes of the instant application that portion of the anode lead frame which is interior to the encapsulant is referred to as inner anode lead frame and that portion of the anode lead frame which is external to the encapsulant, starting for illustration purposes at about the bend, 32, is referred to as the external anode lead frame. The external cathode lead frame has a cathode foot, 34 and the external anode leadframe has an anode foot, 36, with a preference for the cathode foot and anode foot to be coplanar to facilitate mounting of the capacitor on a circuit. The current path length for a capacitor of FIG. 1 is illustrated in FIG. 2 wherein the current path length is represented at 901.

Figure 3:
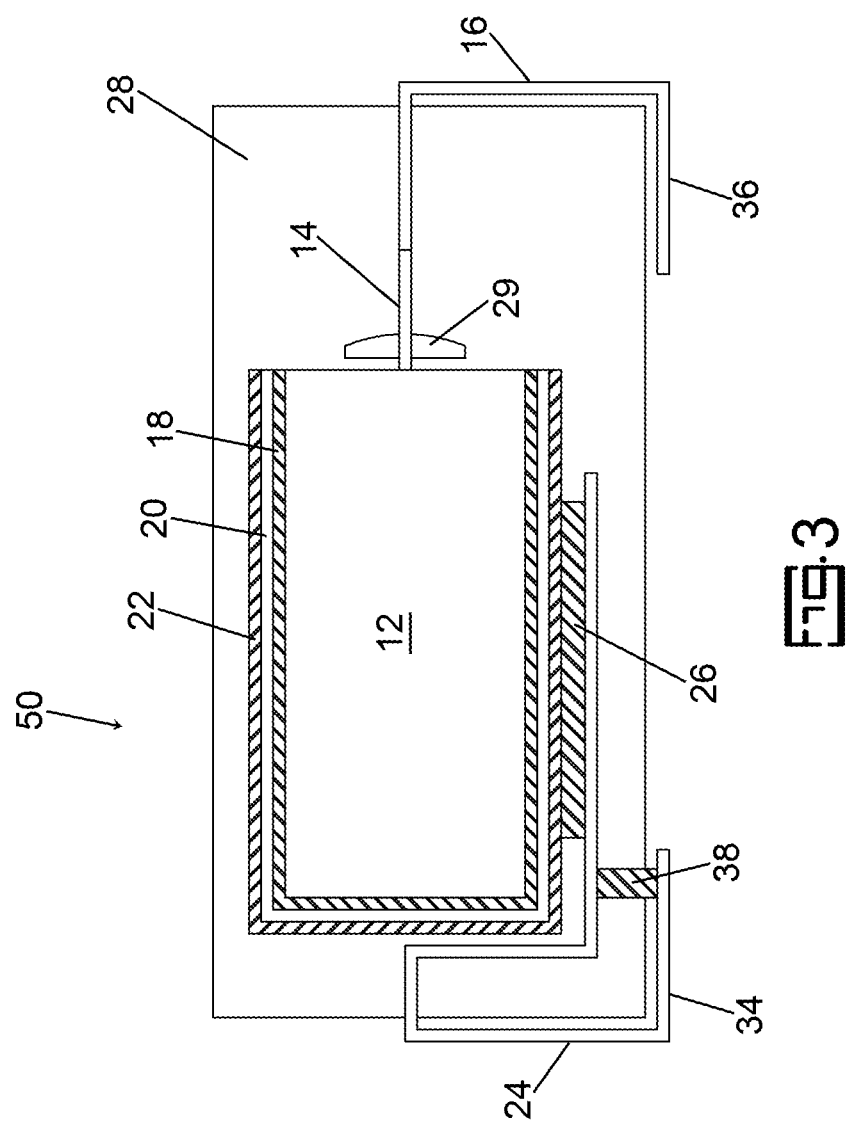
FIG. 3 is a schematic cross-sectional view of an embodiment of the invention.

An embodiment of the invention is illustrated in cross-sectional view in FIG. 3. In FIG. 3, the solid electrolytic capacitor, 50, comprises an anode, 12; anode wire, 14; anode lead, 16; dielectric, 18; cathode, 20; cathode bonding layer, 22; cathode lead, 24; conductive adhesive, 26, and encapsulant, 28, and barrier, 29, as described relative to FIG. 1. A secondary electrical connection, 38, extends between the external cathode lead at the cathode foot, 34, and internal cathode lead to form a secondary and preferred path for current to flow as would now be realized from the discussion herein and further clarified here below.

Figure 4:
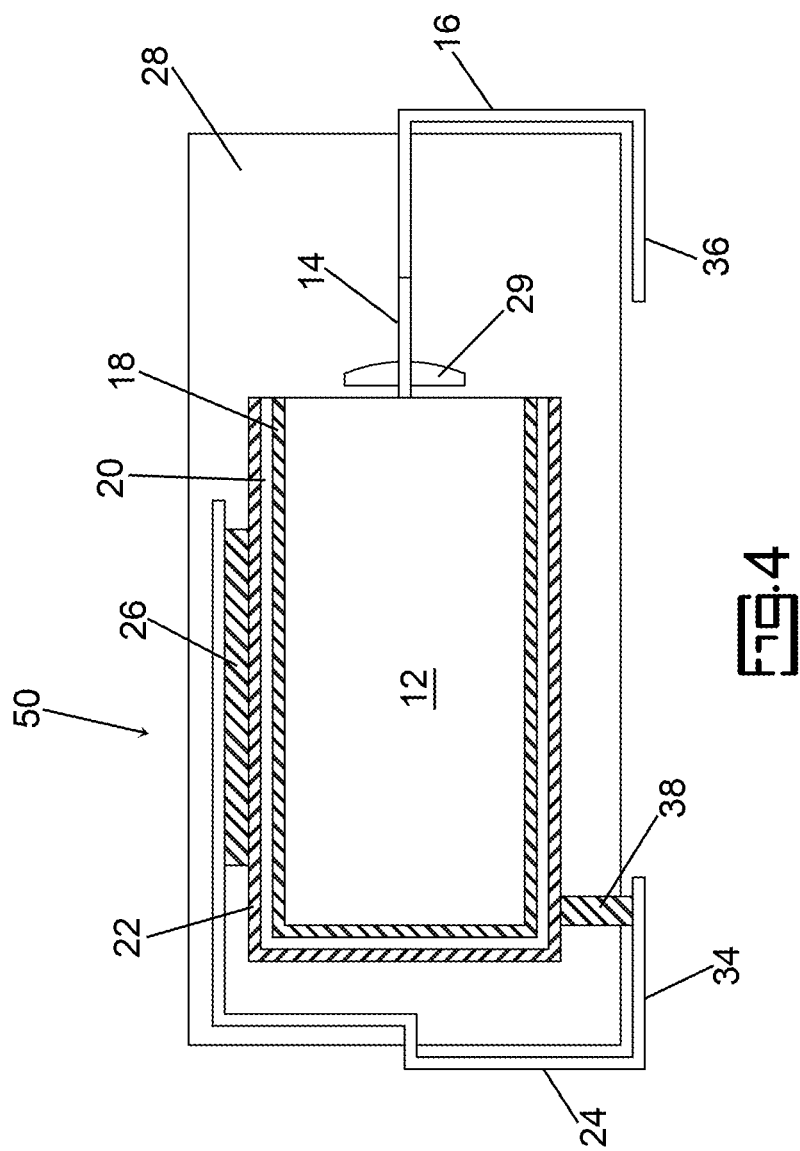
FIG. 4 is a schematic cross-sectional view of an embodiment of the invention.

An embodiment of the invention is illustrated in cross-sectional schematic view in FIG. 4 wherein the internal cathode lead frame is attached to the cathode by a conductive adhesive, 26, on the face opposite the cathode foot, 34. In FIG. 4, the solid electrolytic capacitor, 50, comprises an anode, 12; anode wire, 14; anode lead, 16; dielectric, 18; cathode, 20; cathode bonding layer, 22; cathode lead, 24; conductive adhesive, 26, and encapsulant, 28, as described relative to FIGS. 1 and 3. A secondary electrical connection, 38, extends between the external cathode lead, 34, and internal cathode component, represented as the cathode bonding layer, to form a secondary and preferred path for current to flow as would now be realized from the discussion herein and further clarified here below.

Figure 5:
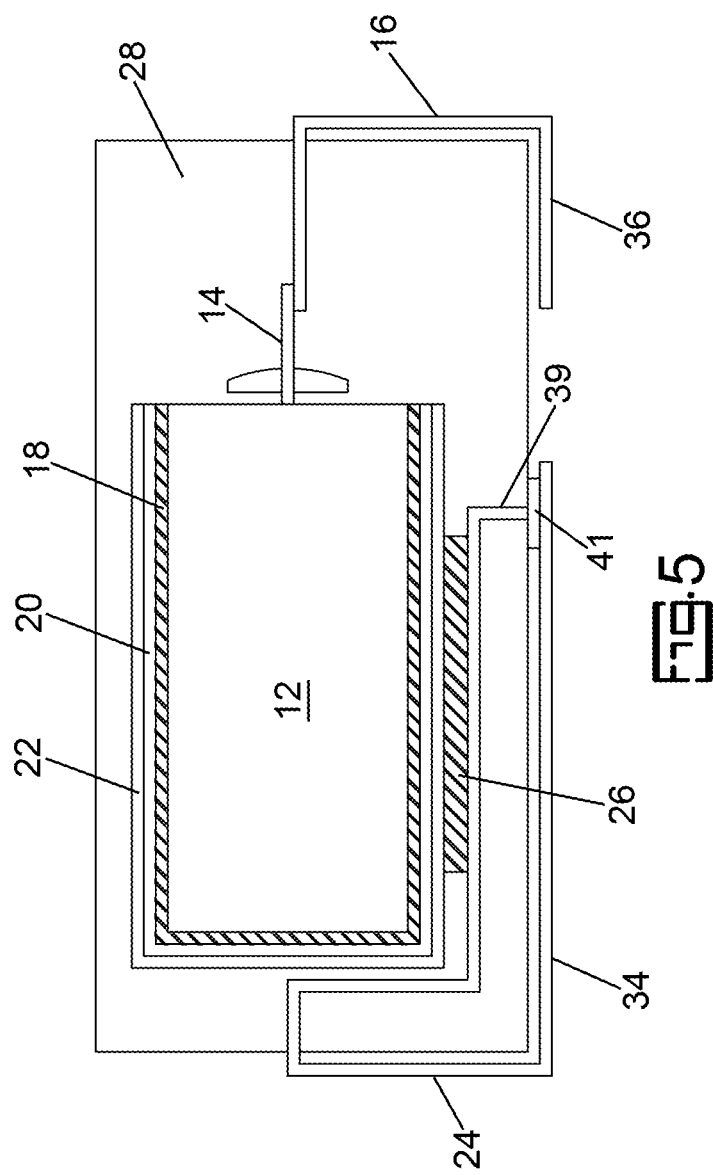
FIG. 5 is a schematic cross-sectional view of an embodiment of the invention.

An embodiment of the invention is illustrated in cross-sectional schematic view in FIG. 5. In FIG. 5, the solid electrolytic capacitor, 50, comprises an anode, 12; anode wire, 14; anode lead, 16; dielectric, 18; cathode, 20; cathode bonding layer, 22; cathode lead, 24; conductive adhesive, 26, and encapsulant, 28, and barrier, 29, as described relative to FIGS. 1 and 3. A secondary electrical connection, 39, extends between the external cathode lead, 34, and internal cathode lead to form a secondary and preferred path for current to flow at the distal end of the internal cathode lead relative to the exit of the internal cathode lead from the encapsulant, 28, which corresponds approximately to the bend as would now be realized from the discussion herein and further clarified here below. In FIG. 5 the cathode leadframe and anode leadframe are asymmetrical with regards to the lengths of the feet. The relative lengths of the anode foot and cathode foot can be altered to optimize the current path. The secondary electrical connection, 39, is formed as an extension of the internal cathode lead which is bent downward to extend beyond the encapsulant for electrical connection, preferably at the distal end of the external cathode lead, by a conductive bond, 41.

Figure 6:
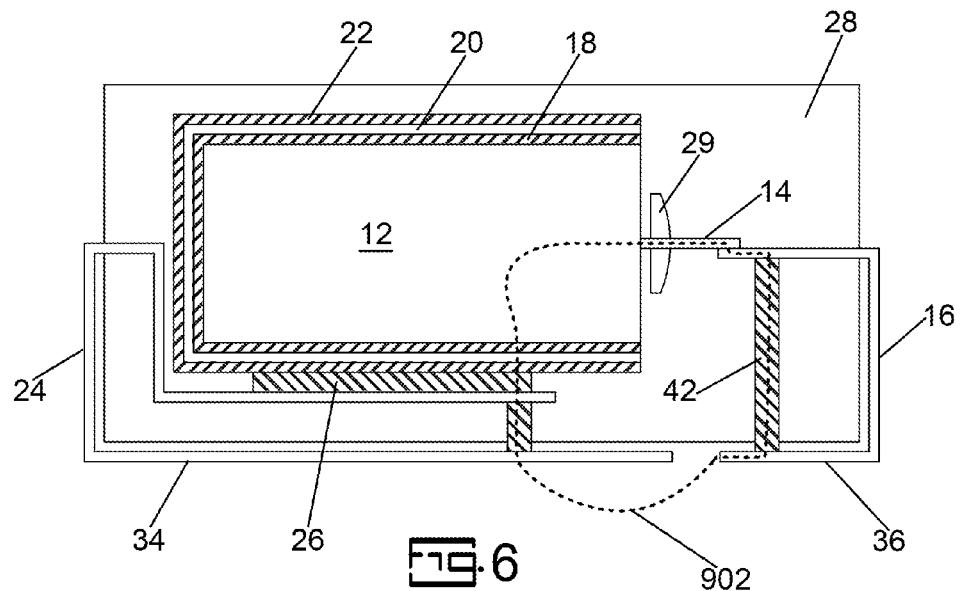
FIG. 6 is a schematic representation of advantages provided by the invention.
Figure 7:
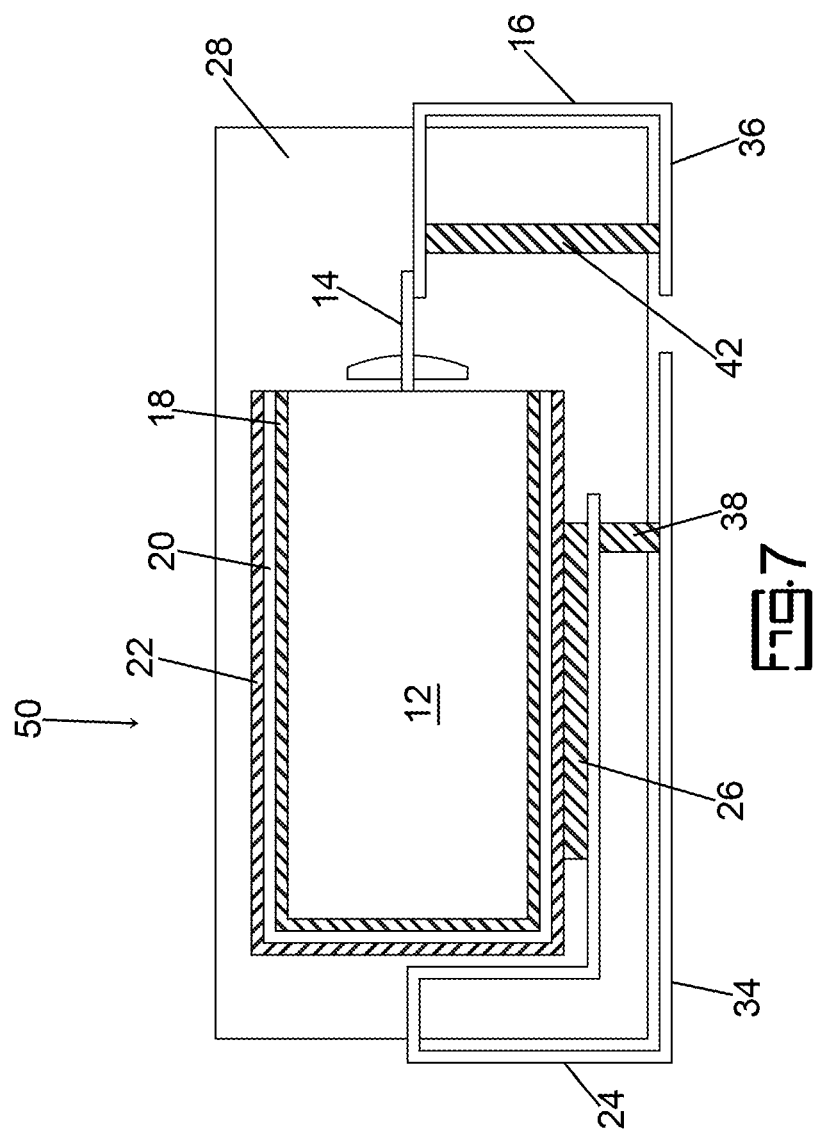
FIG. 7 is a schematic cross-sectional view of an embodiment of the invention.

An embodiment of the invention is illustrated in cross-sectional view in FIG. 7. In FIG. 7, the solid electrolytic capacitor, 50, comprises an anode, 12; anode wire, 14; anode lead, 16; dielectric, 18; cathode, 20; cathode bonding layer, 22; cathode lead, 24; conductive adhesive, 26; encapsulant, 28 and a first secondary electrical connection, 38. A second secondary electrical connection, 42, which can be referred to herein as an anode secondary electrical connection is provided between the anode foot, 36, and internal anode component thereby providing an alternate path for current to flow which is shorter than the path through the anode lead frame, 16. The secondary electrical connection, 38, on the cathode side, which can be referred to herein as a cathode secondary electrical connection and anode secondary electrical connection, 42, combined reduce the inductance loop area further thereby reducing the part inductance. The anode secondary electrical connection, 42, is shown connecting to the internal anode leadframe even though it may be connected directly to the anode lead wire which is less preferred due to manufacturing complexities. The current path length for a capacitor of FIG. 7 is illustrated in FIG. 6 wherein the current path length is represented at 902.

Figure 8:
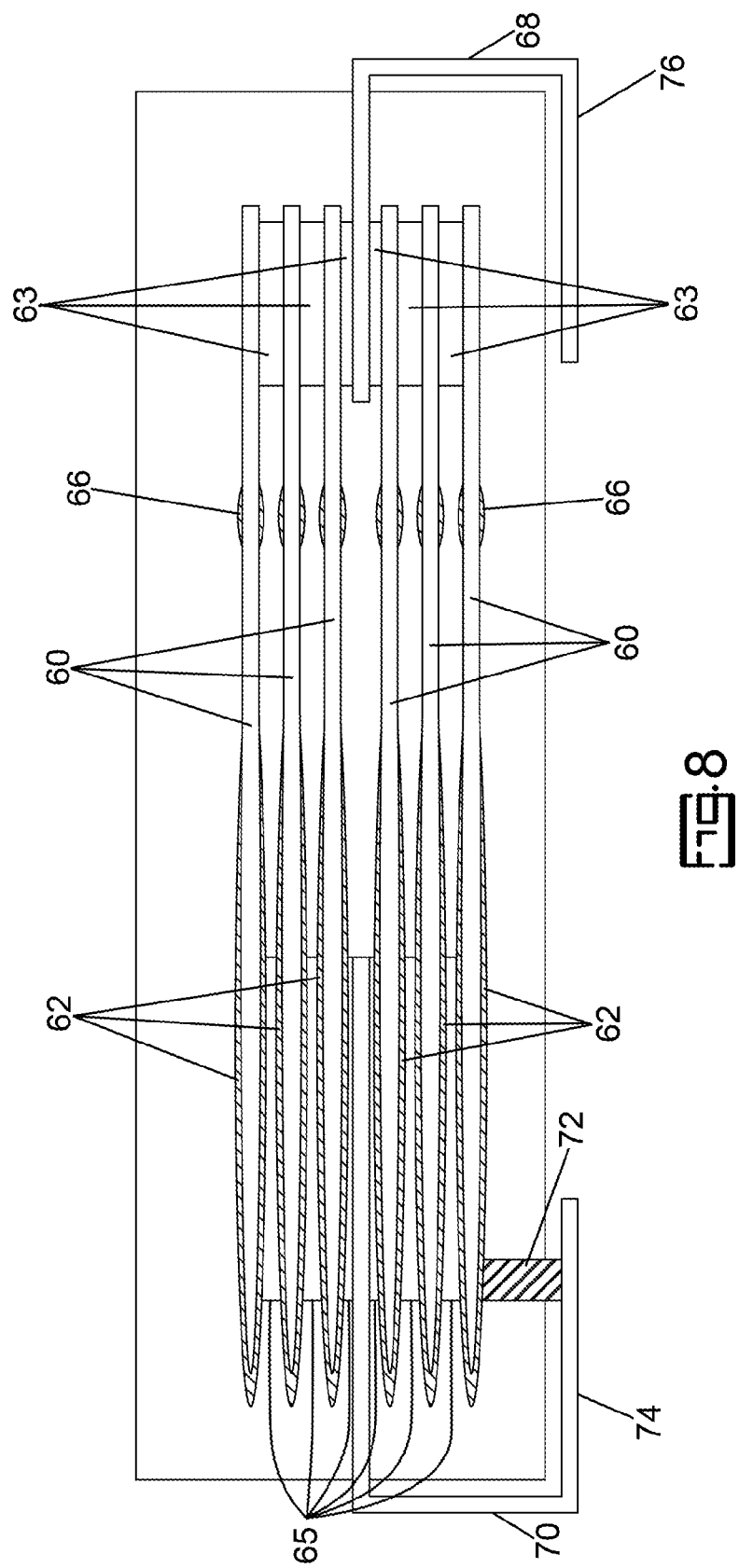
FIG. 8 is a schematic cross-sectional view of an embodiment of the invention.

An embodiment of the invention is illustrated in cross-sectional schematic view in FIG. 8 as a multiple anode capacitor comprising multiple capacitive elements in a common capacitor. In FIG. 8, each capacitive element is, itself, a capacitor comprising an anode, 60, typically in the form of a foil or sheet. A dielectric, not shown, encases at least a portion of the anode and preferably the entire anode. A cathode, 62, which comprises at least a conductive layer and preferably also comprises a cathode adhesive layer, encases at least a portion of the dielectric with the proviso that the cathode is not in direct electrical contact with the anode. An optional, but preferred, barrier, 66, is provided for manufacturing convenience to inhibit cathode formation beyond the barrier thereby leaving a portion of the anode exposed for electrical connection to each other and to an anode lead, 68, by conductive bonds, 63, such as welds as known in the art. A cathode lead, 70, is in electrical connection with the cathode layers, 62, by conductive bonds, 65, such as conductive adhesive as known in the art. A secondary electrical connection, 72, extends between the cathode foot, 74, and an interior cathode component represented as a cathode layer of the closest capacitive element. As would be realized it is preferred that the cathode foot, 74, and anode foot, 76, are coplanar to facilitate mounting on a circuit. It is preferred in this embodiment that the secondary electrical connection be made to the closest conductive cathode layer of the closest capacitive element to the cathode terminal.

Figure 9:
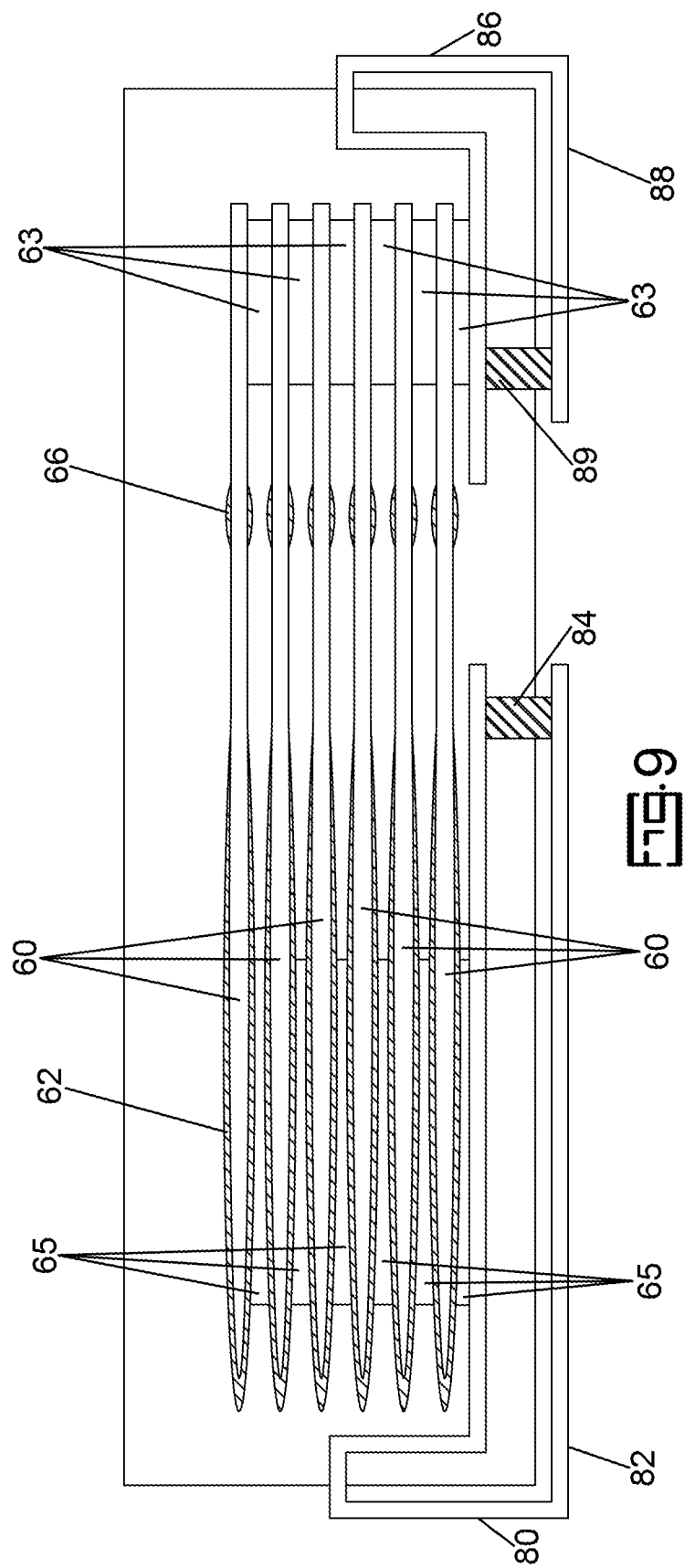
FIG. 9 is a schematic cross-sectional view of an embodiment of the invention.

An embodiment of the invention is illustrated in cross-sectional view in FIG. 9. In FIG. 9 the anode, 60; dielectric, not shown; conductive bonds, 63, cathode, 62; conductive bonds, 65 and barrier, 66 are as described in FIG. 8. The embodiment of FIG. 9 is illustrated with asymmetrical leadframes wherein the cathode leadframe, 80, has a cathode foot, 82, which is a different length than the anode foot, 88, of the anode leadframe, 86. A cathode secondary electrical connection, 84, is at the distal end of the cathode leadframe relative to the exit location of the cathode lead from the encapsulant. An anode secondary electrical connection, 89, provides a secondary conductive path which is shorter than the conductive path provided by the anode lead frame. In the embodiment of FIG. 9 the cathode secondary electrical connection is in direct electrical contact with the internal cathode leadframe and the external cathode lead frame. Also, in the embodiment of FIG. 9 the anode secondary electrical connection is in direct electrical contact with the internal anode leadframe and the external anode lead frame. In each case the secondary electrical connection forms an electrical path which is shorter than the electrical path defined by the leadframe.

An embodiment of the invention is illustrated in cross-sectional schematic view in FIG. 10. In FIG. 10, a multiplicity of capacitive elements, 90, is shown in a stack. Each capacitive element comprises an anode and cathode which are not shown in this view. Cathode leads, 92, are interleaved with the capacitive elements to collect current from adjacent cathodes. The cathodes terminate at a cathode manifold, 94, which is in electrical contact with a cathode leadframe, 96. A secondary electrical connection, 98, spans between the cathode foot, 100, and closest cathode. Anode leads, 102, extend from each anode and terminate at an anode manifold, 104. The anode manifold is in electrical contact with an anode leadframe, 103, with an anode foot, 106. The anode is preferably a foil or sheet.

By retaining the primary electrical connection through the traditional leadframes the low frequency resistance and high current applications can be further improved over many of the prior art designs that result in smaller electrical connection paths. The secondary electrical connection path can improve the high frequency inductance while retaining the standard design advantages. By having the larger more prominent primary electrical connection leadframe portion of the device additional heat sinking properties can be achieved, whereas the insulation properties of the substrate designs can result in a larger heat buildup inside the device.

An embodiment of the invention will be described with reference to FIGS. 11A-11E wherein a series of partial cross-section schematic views are provided thereby allowing the process for preparing the secondary electrical connection to be described. In FIG. 11A, an internal conductor, 1002, which may be a cathode component or an anode component is illustrated. A thru-hole, 1003, in the encapsulant, 1004, is either formed by a removal method or a formation method as described elsewhere herein. FIG. 11B illustrates the thru-hole filled with a conductor, 1001, and in electrical contact with an external leadframe, 1007, which is either a cathode leadframe or an anode leadframe. An alternative embodiment is illustrated in FIGS. 11C-11E wherein at least the thru-hole and alternatively a portion of the encapsulant is plated with a conductor, 1005.

The anode is a conductor and most preferably a metal conductor. While not limited thereto valve metals, or conductive oxides of valve metals, are particularly suitable for demonstration of the invention. More preferably the anode comprises a valve metal, a mixture, alloy or conductive oxide of a valve metal preferably selected from Al, W, Ta, Nb, Ti, Zr and Hf. Most preferably the anode comprises at least one material selected from the group consisting of Al, Ta, Nb and NbO. Conductive polymeric materials may be employed as an anode material. Particularly preferred conductive polymers include polypyrrole, polyaniline and polythiophene. Aluminum is typically employed as a foil while tantalum is typically prepared by pressing tantalum powder and sintering to form a compact.

The cathode layer is a conductive layer preferably comprising conductive polymer, such as polythiophene, polyaniline, polypyrrole or their derivatives; manganese dioxide, lead oxide or combinations thereof. An intrinsically conducting polymer is most preferred. A particularly preferred polymer is 3,4-polyethylene dioxythiophene (PEDT). The polymer can be applied by any technique commonly employed in forming layers on a capacitor including dipping, spraying oxidizer dopant and monomer onto the pellet or foil, allowing the polymerization to occur for a set time, and ending the polymerization with a wash. The polymer can also be applied by electrolytic deposition as well known in the art.

The anode is preferably etched to increase the surface area, particularly, if the anode is a valve metal foil such as aluminum foil. Etching is preferably done by immersing the anode into at least one etching bath. Various etching baths are taught in the art and the method used for etching the anode is not limited herein.

The anode lead is preferably attached to the anode, particularly when a compact is employed. The anode lead can be attached by welding or by embedding into the powder prior to pressing. A valve metal is a particularly suitable anode lead and in a preferred embodiment the anode and anode lead are the same material.

A dielectric is formed on the surface of the anode and preferably a roughened surface to increase surface area. The dielectric is a non-conductive layer which is not particularly limited herein. The dielectric may be a metal oxide or a ceramic material. A particularly preferred dielectric is the oxide of a metal anode due to the simplicity of formation and ease of use. The dielectric layer is preferably an oxide of the valve metal as further described herein. It is most desirable that the dielectric layer be an oxide of the anode. The dielectric is preferably formed by dipping the anode into an electrolyte solution and applying a positive voltage to the anode. Electrolytes for the oxide formation are not particularly limiting herein but exemplary materials can include ethylene glycol; polyethylene glycol dimethyl ether as described in U.S. Pat. No. 5,716,511; alkanolamines and phosphoric acid, as described in U.S. Pat. No. 6,480,371; polar aprotic solvent solutions of phosphoric acid as described in U.K. Pat. No. GB 2,168,383 and U.S. Pat. No. 5,185,075; complexes of polar aprotic solvents with protonated amines as described in U.S. Pat. No. 4,812,951 or the like. Electrolytes for formation of the dielectric on the anode including aqueous solutions of dicarboxylic acids, such as ammonium adipate are also known. Other materials may be incorporated into the dielectric such as phosphates, citrates, etc. to impart thermal stability or chemical or hydration resistance to the dielectric layer.

At least one cathode bonding layer is preferably formed on the cathode to enhance adhesion to the lead frame. The cathode bonding layer can be applied by any one or combination of the methods selected from spraying, dipping, brushing, printing, and ink jet. It is preferably that the cathode bonding layer comprise at least one carbon layer and at least one metal filled layer. The conductive cathode layers preferably comprise at least one of a carbon paint layer, metal paint layer, plated metal layer or cathode foil.

The invention has been described with reference to the preferred embodiments without limit thereto. One of skill in the art would realize additional embodiments and improvements which are not specifically set forth herein but which are within the scope of the invention as more specifically set forth in the claims appended hereto.

The invention claimed is:

1. A capacitor comprising;
   at least one anode with a dielectric on said anode and an anode lead extending from said anode;
   a conductive cathode layer on said dielectric;
   an anode leadframe electrically connected to said anode;
   a cathode leadframe electrically connected to said cathode thereby forming an electrical connection with a first path;
   an encapsulant encasing said anode and a portion of said cathode leadframe such that at least a portion said anode leadframe is exterior to said encapsulant and forms an external anode leadframe and said cathode leadframe extends from said encapsulant to form an external cathode leadframe;
   at least one secondary electrical connection wherein said secondary electrical connection is in electrical contact with said cathode within said encapsulant and extends through said encapsulant to said external cathode leadframe or said secondary electrical connection is in electrical contact with said anode within said encapsulant and extends through said encapsulant to said external anode leadframe and
   wherein said secondary electrical connection forms a secondary path for current flow wherein said first path is longer than said secondary path.

2. The capacitor of claim 1 wherein said anode is a valve metal or conductive oxide of said valve metal.

3. The capacitor of claim 2 wherein said anode comprises a roughened surface area with said dielectric on said roughened surface area.

4. The capacitor of claim 1 wherein said conductive cathode layer comprises at least one of an intrinsically conductive polymer or manganese dioxide.

5. The capacitor of claim 1 wherein said conductive cathode layer comprises at least one of a carbon paint layer, metal paint layer, plated metal layer or cathode foil.

6. The capacitor of claim 1 wherein said conductive cathode layer on said dielectric is separated from said anode lead by a barrier material.

7. The capacitor of claim 1 wherein said encapsulant comprises at least one thru-hole between an external surface of said encapsulant and either an electrical contact point with said cathode or an electrical contact point with said anode.

8. The capacitor of claim 7 wherein a secondary electrical connection extends through said thru-hole.

9. The capacitor of claim 8 wherein said electrical contact point with said cathode comprises at least one contact point chosen from the group consisting of an internal leadframe portion, an internal conductive cathode layer, or an internal cathode foil.

10. The capacitor of claim 1 wherein said secondary electrical connection is at a distal end of said cathode leadframe.

11. The capacitor of claim 1 comprising multiple capacitor elements.

12. A method of forming a capacitor comprising;
providing a capacitive element comprising:
an anode with a dielectric on a surface of said anode and an anode lead extending from said anode; and
a conductive cathode on said dielectric;
electrically connecting said conductive cathode layer to a cathode leadframe thereby forming an electrical connection with a first path;
electrically connecting said anode to an anode leadframe;
forming an encapsulant around said anode and a portion of said cathode lead frame such that said cathode leadframe extends from said encapsulant;
forming at least one of an anode secondary electrical connection wherein said anode secondary electrical connection forms a secondary path for current flow or a cathode secondary electrical connection through said encapsulant wherein said cathode secondary electrical connection forms a secondary path for current flow wherein said first path is longer than said secondary path.

13. The method of forming a capacitor of claim 12 wherein said anode is a valve metal or a conductive oxide of said valve metal.

14. The method of forming a capacitor of claim 13 wherein said anode comprises a roughened surface.

15. The method of forming a capacitor of claim 12 wherein said conductive cathode comprises at least one of an intrinsically conductive polymer or manganese dioxide.

16. The method of forming a capacitor of claim 12 wherein said conductive cathode comprises at least one of a carbon paint layer, metal paint layer, plated metal layer or cathode foil.

17. The method of forming a capacitor of claim 12 further comprising forming a barrier on said dielectric.

18. The method of forming a capacitor of claim 12 comprising forming a thru-hole in said encapsulant wherein said secondary electrical connection is received by said thru-hole.

19. The method of forming a capacitor of claim 18 wherein said thru-hole is formed by a method selected from a removal method and a formation method.

20. The method of forming a capacitor of claim 19 wherein said method is selected from the group consisting of laser drilling, mechanical removal, ion milling, puncturing, chemical etching, masking and injection molding.

21. A method of forming a capacitor of claim 12 wherein said secondary electrical connection is in electrical contact with at least one chosen element chosen from the group consisting of internal leadframe portion, internal conductive cathode layer and internal cathode foil.

22. The method of forming a capacitor of claim 12 wherein said secondary electrical contact is at a distal end of said cathode leadframe.

23. The method of forming a capacitor of claim 12 comprising providing multiple capacitive elements.

* * * * *